(12) United States Patent
Matsukuma et al.

(10) Patent No.: US 11,085,704 B2
(45) Date of Patent: Aug. 10, 2021

(54) COMPRESSED AIR ENERGY STORAGE POWER GENERATION DEVICE

(71) Applicant: KOBE STEEL, LTD., Hyogo (JP)

(72) Inventors: Masaki Matsukuma, Takasago (JP); Hiroki Saruta, Takasago (JP); Yuji Matsuo, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 16/969,963

(22) PCT Filed: Jan. 18, 2019

(86) PCT No.: PCT/JP2019/001492
§ 371 (c)(1),
(2) Date: Aug. 13, 2020

(87) PCT Pub. No.: WO2019/163348
PCT Pub. Date: Aug. 29, 2019

(65) Prior Publication Data
US 2020/0408469 A1 Dec. 31, 2020

(30) Foreign Application Priority Data

Feb. 26, 2018 (JP) .............................. JP2018-032205

(51) Int. Cl.
*F28D 20/00* (2006.01)
*H02J 15/00* (2006.01)
(Continued)

(52) U.S. Cl.
CPC ........ *F28D 20/0056* (2013.01); *H02J 15/006* (2013.01); *F02C 1/04* (2013.01);
(Continued)

(58) Field of Classification Search
CPC ........ F28D 20/0056; F02C 1/04; H02J 15/006
See application file for complete search history.

(56) References Cited

U.S. PATENT DOCUMENTS

2016/0177822 A1* 6/2016 Howes ..................... F02C 3/04
60/785
2017/0284336 A1* 10/2017 Sakamoto ................ F02C 7/10

FOREIGN PATENT DOCUMENTS

JP 2016211515 A 12/2016

* cited by examiner

*Primary Examiner* — Shafiq Mian
(74) *Attorney, Agent, or Firm* — Studebaker & Brackett PC

(57) ABSTRACT

A CAES power generation device includes a plurality of compression/expansion/combined machines, a pressure accumulation unit for storing compressed air, a plurality of heat exchangers, a heat storage unit for storing a heating medium, and a plurality of first containers 10 having a rectangular parallelepiped shape for accommodating the plurality of compression/expansion/combined machines and the plurality of heat exchangers. The plurality of first containers are arranged side by side so that long side surfaces face each other. The long side surface of the first container is provided with at least one vent being an outlet of a pipe for communicating the compression/expansion/combined machine with the outside of the container. A short side surface of the first container is provided with a first takeout port for taking out an air pipe that fluidly connects the compression/expansion/combined machine and the pressure accumulation unit, and a second takeout port for taking out a heating medium pipe that fluidly connects the heat exchanger and the heat storage unit.

12 Claims, 7 Drawing Sheets

(51) Int. Cl.
*F03D 9/17* (2016.01)
*F02C 1/04* (2006.01)
(52) U.S. Cl.
CPC ............ *F03D 9/17* (2016.05); *F05D 2260/42* (2013.01); *F28D 2020/0082* (2013.01)

COMPRESSED AIR ENERGY STORAGE POWER GENERATION DEVICE

CROSS-REFERENCE TO RELATED APPLICATIONS

This is a national phase application in the United States of International Patent Application No. PCT/JP2019/001492 with an international filing date of Jan. 18, 2019, which claims priority of Japanese Patent Application No. 2018-032205 filed on Feb. 26, 2018 the contents of which are incorporated herein by reference.

TECHNICAL FIELD

The present invention relates to a compressed air energy storage power generation device.

BACKGROUND ART

The power generation using renewable energy such as wind power or sunlight produces power varying depending on weather. Therefore, a power plant using renewable energy such as a wind power plant or a solar power plant may be provided with an energy storage device in order to smooth the fluctuation in the power generation amount. As an example of such an energy storage device, a compressed air energy storage (CAES) power generation device is known.

Patent Document JP 2016-065535 A discloses a CAES power generation device in which a plurality of compressors and expanders are arranged in a container to facilitate transportation and on-site construction. Patent Document JP 2016-211515 A discloses a CAES power generation device in which a part of a plurality of compressors and expanders are used as compression-expansion combined machines having both a compression function and an expansion function.

SUMMARY

CAES power generation devices may upsize depending on a required power. When the CAES power generation device upsizes, wires and pipes become longer and more complicated, and the construction cost also becomes higher. However, in the CAES power generation device of Patent Document JP 2016-065535 A, arrangement of containers and the like are not examined in detail, that is, downsizing is not examined in detail. In addition, in the CAES power generation device of Patent JP 2016-211515 A, no particular examination is made on downsizing the CAES power generation device by using a compression-expansion combined machine. Therefore, the CAES power generation devices of JP 2016-065535 A and JP 2016-211515 A have room for improvement in downsizing.

An object of the present invention is to provide a compressed air energy storage power generation device that facilitates transportation and on-site construction and enables downsizing.

The present invention provides a compressed air energy storage power generation device including: a plurality of compression-expansion combined machines having a function of compressing air using electric power and a function of generating power by expanding compressed air; a pressure accumulation unit fluidly connected to each compression-expansion combined machine, and configured to store the compressed air; a plurality of heat exchangers configured to exchange heat between the compressed air and a heating medium to cool the compressed air supplied from each compression-expansion combined machine to the pressure accumulation unit and heat the heating medium, or to heat the compressed air supplied from the pressure accumulation unit to each compression-expansion combined machine and cool the heating medium; a heat storage unit fluidly connected to each of the heat exchangers, and configured to store the heating medium; and a plurality of first containers having a rectangular parallelepiped shape. Each of the plurality of first containers accommodates the plurality of compression-expansion combined machines and the plurality of heat exchangers. The plurality of first containers are arranged side by side so that long side surfaces face each other. The long side surface of each of the first containers is provided with at least one vent being an outlet of a pipe for communicating each compression-expansion combined machine with an outside of a container. A short side surface of each of the first containers is provided with a first takeout port for taking out an air pipe that fluidly connects each compression-expansion combined machine and the pressure accumulation unit, and a second takeout port for taking out a heating medium pipe that fluidly connects each of the heat exchangers and the heat storage unit.

According to this configuration, when the electric power is surplus due to fluctuations in the electric energy generated by renewable energy and the like, the compression-expansion combined machines are driven as compressors using the surplus electric power, and the compressed air is stored in the pressure accumulation unit. When the electric power is insufficient, the compression-expansion combined machines are driven as expanders using the compressed air of the pressure accumulation unit to generate electric power. As described above, since the compression-expansion combined machines are switched and used in a timely manner, as compared with the case where compressors and expanders are provided individually, the number of installed machines can be reduced, and as a result, the cost can also be reduced. In addition, when the compression-expansion combined machines are driven as compressors, the temperature of the compressed air rises due to the compression heat, the heating medium is heated by the compression heat in the heat exchanger, and the high temperature heating medium is stored in the heat storage unit. Then, when the compression-expansion combined machines are driven as expanders, heating the compressed air supplied to the compression-expansion combined machines using the high temperature heating medium in the heat storage unit in the heat exchanger improves power generation efficiency.

In addition, particularly according to this configuration, since a plurality of compression-expansion combined machines and a plurality of heat exchangers are accommodated in each of the first containers, the transportation and the on-site construction can be easily performed. In the first containers, since the vent is provided on the long side surface having a large contact area with the atmosphere, intake and exhaust can be efficiently performed. Since the short side surface is provided with the first takeout port and the second takeout port, even if a plurality of first containers are arranged side by side with small intervals so that long side surfaces face each other, there is no obstruction to the handling of the air pipe and the heating medium pipe. Therefore, since the first containers, the pressure accumulation unit, the heat storage unit, and the like can be efficiently arranged in a small area, the CAES power generation device can be downsized. Here, each of the long side surfaces of the first containers include not only a side surface perpendicular to the installation surface but also an upper surface parallel to the installation surface. In addition, the air pipe includes not only one that directly connects the compression-expansion combined machines and the pressure accumulation unit but also one that indirectly connects them.

The at least one vent may be provided only on one surface of the long side surfaces, and comprise a plurality of vents. The plurality of vents may be provided at a plurality of places according to a number of the compression-expansion combined machines.

According to this configuration, since the at least one vent is provided on the same surface in each of the first containers, maintainability can be improved. Generally, since the vent and the compression-expansion combined machines are connected with a pipe, it is difficult to open and close the surface on which the at least one vent is provided in each of the first containers. Therefore, if the at least one vent is provided on a plurality of surfaces, the plurality of surfaces that can be opened and closed are limited, and maintainability deteriorates. In other words, when all of the at least one vents are provided on the same surface as in the present configuration, the other surfaces can be easily opened and closed, so that maintainability can be improved. In addition, even if the other surfaces are not openable, a maintenance worker or the like moving on the side on which the vent is not provided when moving near the first containers allows the maintenance worker or the like to move safely without being affected by intake or exhaust.

The compressed air energy storage power generation device may further include a high-pressure stage machine fluidly connected to the plurality of compression-expansion combined machines and used at a pressure higher than a pressure at which the plurality of compression-expansion combined machines are driven. The high-pressure stage machine may be arranged adjacent to the first takeout port in each of the first containers.

With this configuration, when the high-pressure stage machine functions as a compressor, air can be compressed to a high pressure. Therefore, since the pressure of the compressed air stored in the pressure accumulation unit can be increased, the pressure accumulation unit can be downsized. In addition, when the high-pressure stage machine functions as an expander, it is possible to generate electricity using high-pressure compressed air. Specifically, if the high-pressure stage machine is not provided and it is attempted to supply high-pressure compressed air to the compression-expansion combined machines for power generation, it is necessary to reduce the supply pressure according to the pressure resistance performance. At this time, reducing the supply air pressure causes energy loss corresponding to the reduced pressure. However, since the usable pressure range can be expanded by providing the high-pressure stage machine, energy loss can be reduced and power generation efficiency can be improved. It should be noted that the high-pressure stage machine may be any one of a compressor, an expander, and a compression-expansion combined machine. In addition, since the high-pressure stage machine is arranged adjacent to the first takeout port in each of the first containers, the high-pressure stage machine can be easily connected to the pressure accumulation unit.

The compressed air energy storage power generation device may further include an electrical component related to drive of each compression-expansion combined machine, and a second container that accommodates the electrical component.

According to this configuration, the electric components and the compression-expansion combined machines are separately accommodated in separate containers. Therefore, it is possible to prevent harmful effects due to exhaust heat from the compression-expansion combined machines from being exerted on electric components. Here, the electrical components include, for example, an inverter, a converter, a braking resistor, a control panel, and the like.

The compressed air energy storage power generation device may further include a heating medium pump configured to flow the heating medium between each of the heat exchangers and the heat storage unit. The heating medium pump may be accommodated in the second container.

According to this configuration, the heating medium pump enables stable heat exchange in the heat exchanger, and the transportation and on-site construction of the heating medium pump can be facilitated.

In each of the first containers, a cooling water pipe through which cooling water for cooling oil used in each compression-expansion combined machine flows may be provided. A short side surface of each of the first containers may be provided with a third takeout port for taking out the cooling water pipe.

According to this configuration, since the oil used in the compression-expansion combined machines can be cooled by the cooling water, an excessive temperature rise of the compression-expansion combined machines can be prevented. In addition, since the third takeout port is provided on the short side surface of each of the first containers, even if the first containers are arranged side by side so that the long side surfaces face each other as described above, there is no obstruction to the handling of the cooling water pipe. Therefore, each component can be efficiently arranged.

The air pipe may include a pressure feeding pipe portion extending from the pressure accumulation unit, and a connecting pipe portion that connects the pressure feeding pipe portion and each compression-expansion combined machine. The plurality of first containers may be arranged on both sides across the pressure feeding pipe portion, and the short side surface of each of the first containers may face the pressure feeding pipe portion.

According to this configuration, since the first containers are arranged on both sides across the pressure feeding pipe portion, the compressed air energy storage power generation device can be downsized as compared with the case where the first containers are arranged on one side. In addition, since the short side surfaces of the first containers face the pressure feeding pipe portion, many first containers can be arranged along the pressure feeding pipe portion.

According to the present invention, in a compressed air energy storage power generation device, it is possible to facilitate transportation and on-site construction and achieve size reduction.

MODE FOR CARRYING OUT THE INVENTION

In the following, embodiments of the present invention will be described with reference to the accompanying drawings.

First Embodiment

Figure 1:
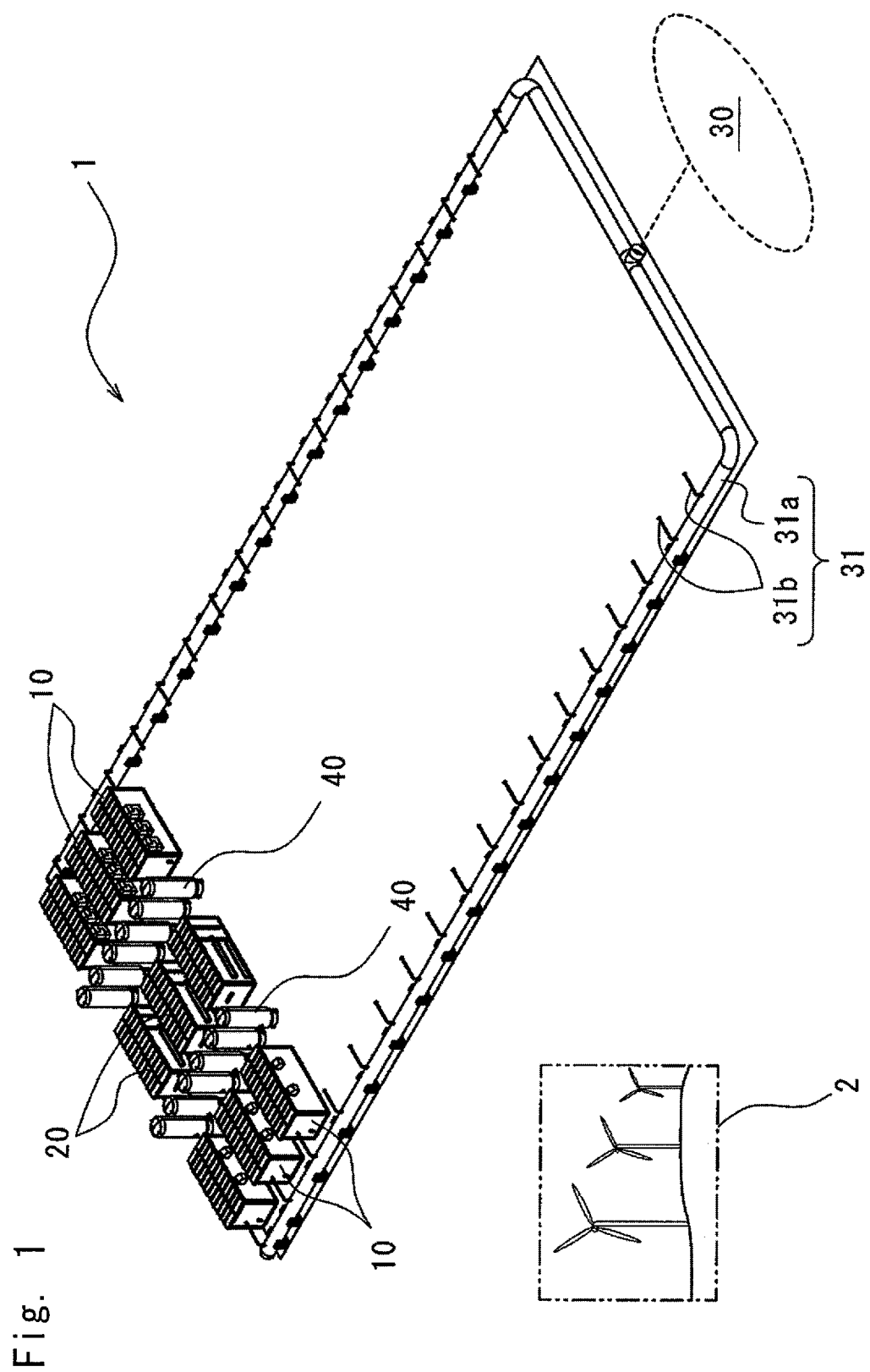
FIG. 1 is a perspective view of a compressed air energy storage power generation device according to a first embodiment of the present invention.

Referring to FIG. 1, a compressed air energy storage (CAES) power generation device 1 is electrically connected to a wind power plant 2. Since the power generation amount of the wind power plant 2 fluctuates depending on weather or the like, the CAES power generation device 1 is provided as an energy storage device for smoothing the fluctuating power generation amount. However, the wind power plant 2 is an example of a facility in which power generation amount fluctuates, using renewable energy or the like.

The CAES power generation device 1 includes a first container 10 for accommodating mechanical components, a second container 20 for accommodating electrical components, and a pressure accumulation unit 30 and a heat storage unit 40 arranged outside these containers. The first container 10 and the pressure accumulation unit 30 are connected via an air pipe 31. The heat storage unit 40 is connected to the first container 10 and the second container 20 via a heating medium pipe 41 (see the broken line in FIG. 2). In FIG. 1, the illustration of a part of the CAES power generation device 1 is omitted in order to prevent the illustration from becoming complicated.

Figure 2:
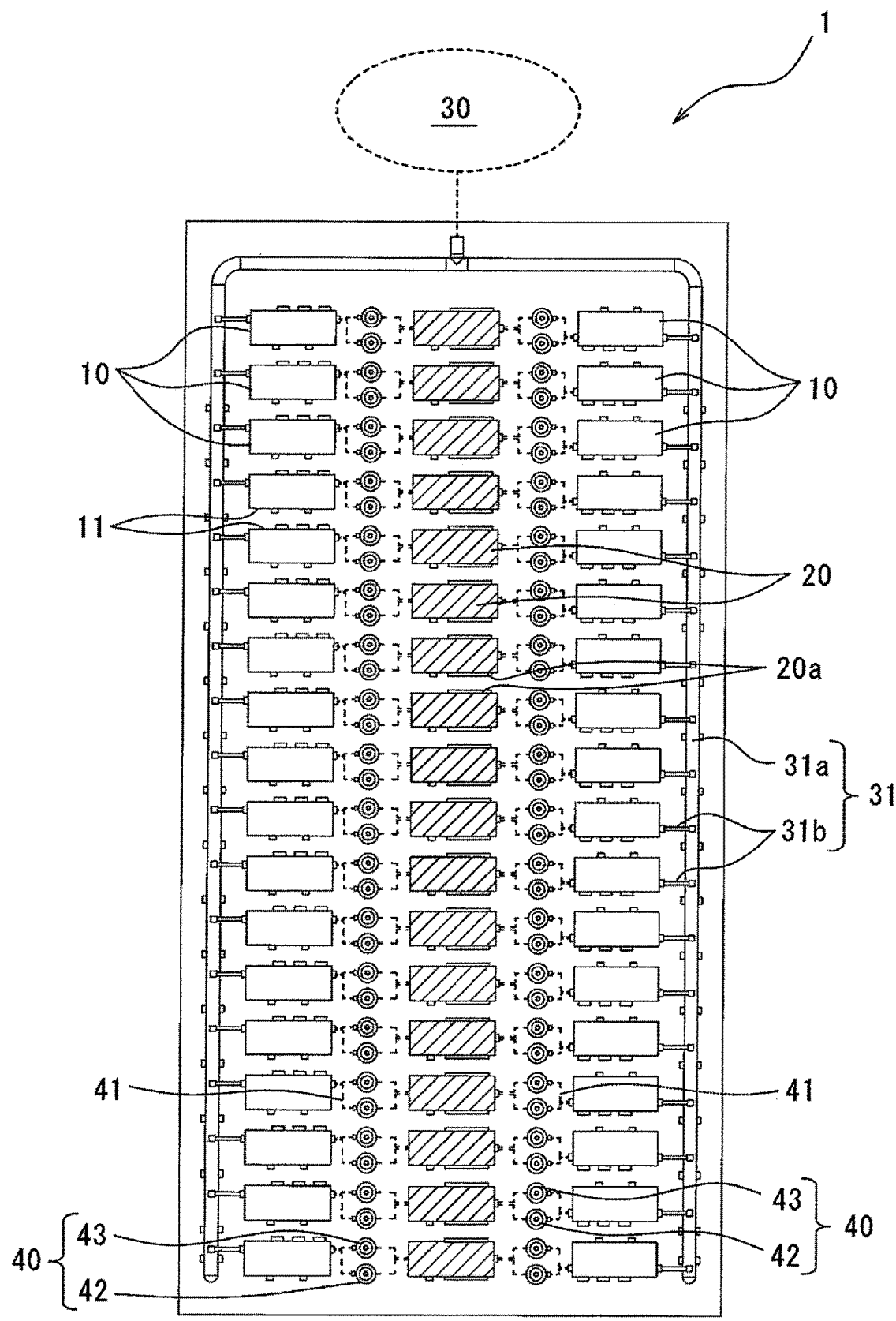
FIG. 2 is a plan view of the compressed air energy storage power generation device.

With reference to FIG. 2, the first container 10 has a rectangular parallelepiped shape, and a plurality of first containers 10 are arranged side by side such that their long side surfaces 11 face each other. In the present embodiment, the first containers 10 are arranged in two rows along the pressure feeding pipe portion 31a of the air pipe 31. The first containers 10 are arranged at equal intervals in the arrangement direction, and the interval is, for example, sufficient for a person to pass through. Between the two rows of the first containers 10, a plurality of second containers 20 having a rectangular parallelepiped shape are arranged side by side in one row. Specifically, the plurality of second containers 20 are arranged side by side so that their long side surfaces 20a face each other similarly to the first containers 10, and are arranged at equal intervals along the arrangement direction of the first containers 10. In the present embodiment, one second container 20 is provided for two first containers 10, and these containers are electrically connected by electrical wires (not shown). It should be noted that in FIG. 2, the second container 20 is virtually hatched to distinguish the first container 10 from the second container 20.

The pressure accumulation unit 30 is conceptually shown in FIGS. 1 and 2. Compressed air is stored in the pressure accumulation unit 30. The mode of the pressure accumulation unit 30 is not particularly limited as long as the pressure accumulation unit 30 can store compressed air, and the pressure accumulation unit 30 may be, for example, a steel tank or an underground space. The pressure accumulation unit 30 is fluidly connected to a compression-expansion combined machine 13 (see FIG. 6) and a high-pressure stage machine 14 (see FIG. 6) in the first container 10 via the air pipe 31 as described below.

A high-temperature heating medium tank 42 and a low-temperature heating medium tank 43 are arranged as the heat storage unit 40 between the first container 10 and the second container 20. One high-temperature heating medium tank 42 and one low-temperature heating medium tank 43 is provided for one first container 10. The high-temperature heating medium tank 42 and the low-temperature heating medium tank 43 are, for example, steel tanks. The high-temperature heating medium tank 42 stores a high temperature heating medium, and the low-temperature heating medium tank 43 stores a low temperature heating medium. As described below, the high-temperature heating medium tank 42 and the low-temperature heating medium tank 43 are connected to the heat exchanger 15 in the first container 10 (see FIG. 7) and the heating medium pump 21 in the second container 20 (see FIG. 8) via the heating medium pipe 41. Therefore, a heating medium flows between one high-temperature heating medium tank 42, one low-temperature heating medium tank 43, and one first container 10. These form one closed heating medium system. It should be noted that the heating medium pipe 41 is schematically illustrated to show the connection destination, and may differ from the actual laid mode. In the present embodiment, each of the high-temperature heating medium tank 42 and the low-temperature heating medium tank 43 is provided for one first container 10 one by one, but a plurality of first containers may share the high-temperature heating medium tank and the low-temperature heating medium tank.

Figure 3:
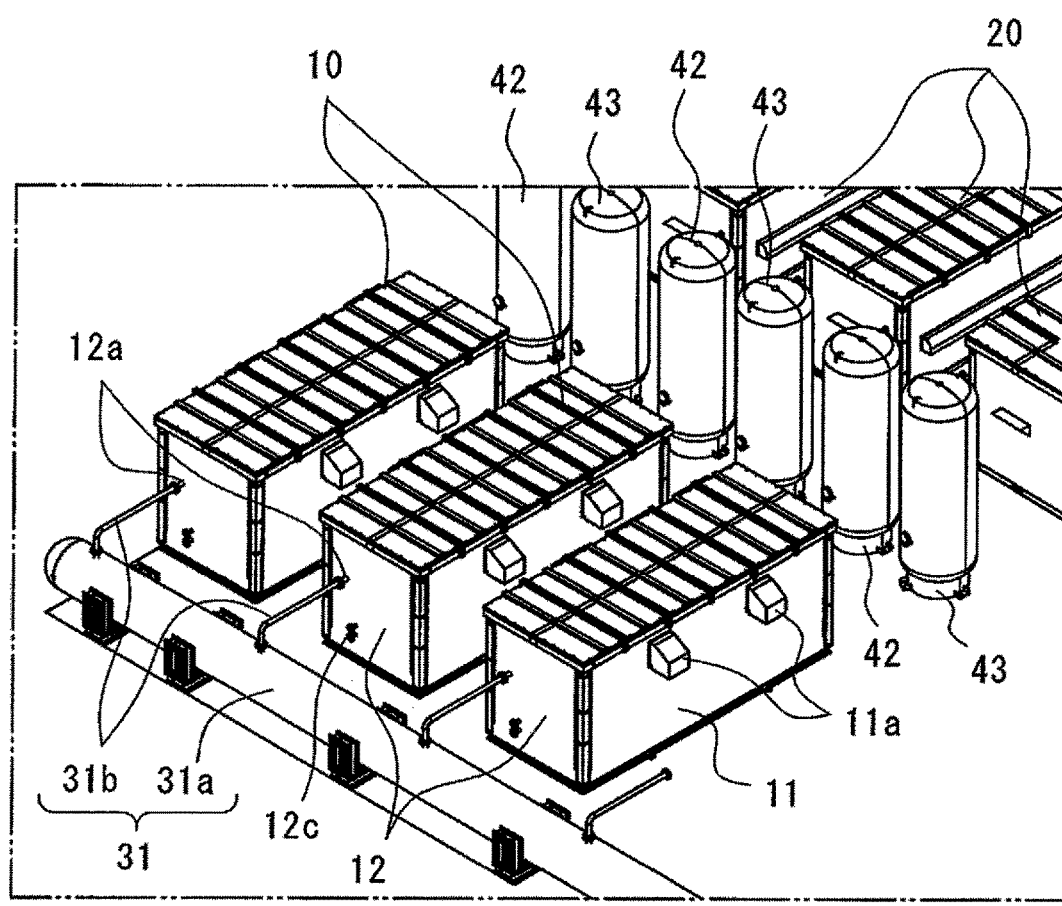
FIG. 3 is a partially enlarged view of the compressed air energy storage power generation device.

With reference to FIG. 3, the short side surface 12 of the first container 10 is provided with a first takeout port 12a for taking out the air pipe 31. The first takeout port 12a is specifically a through hole provided on the short side surface 12 and has a diameter substantially the same as that of the connecting pipe portion 31b. The air pipe 31 includes a pressure feeding pipe portion 31a having a larger diameter and a connecting pipe portion 31b having a smaller diameter. The pressure feeding pipe portion 31a of the present embodiment extends from the pressure accumulation unit 30 and has a U-shape in a plan view (see FIG. 2). The connecting pipe portion 31b connects the pressure feeding pipe portion 31a outside the first container 10 and the compression-expansion combined machine 13 (see FIG. 6) inside the first container 10 through the first takeout port 12a. Outside the first container 10, the connecting pipe portion 31b extends in a direction orthogonal to the short side surface 12 of the first container 10. In the present embodiment, the connecting pipe portion 31b is connected to the upper portion of the pressure feeding pipe portion 31a. In addition, at the upper portion of the long side surface 11 of each first container 10, two ventilating ports 11a that communicate the inside and outside of the first container 10 are provided.

Figure 4:
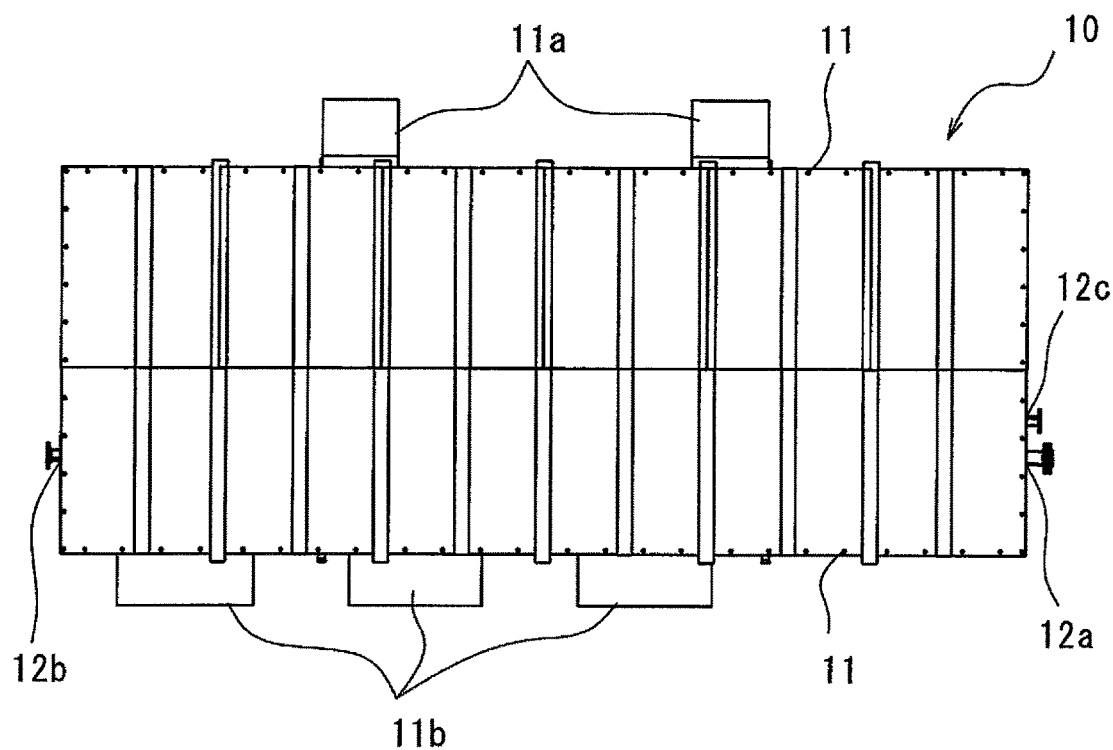
FIG. 4 is a plan view showing the outside of a first container.
Figure 5:
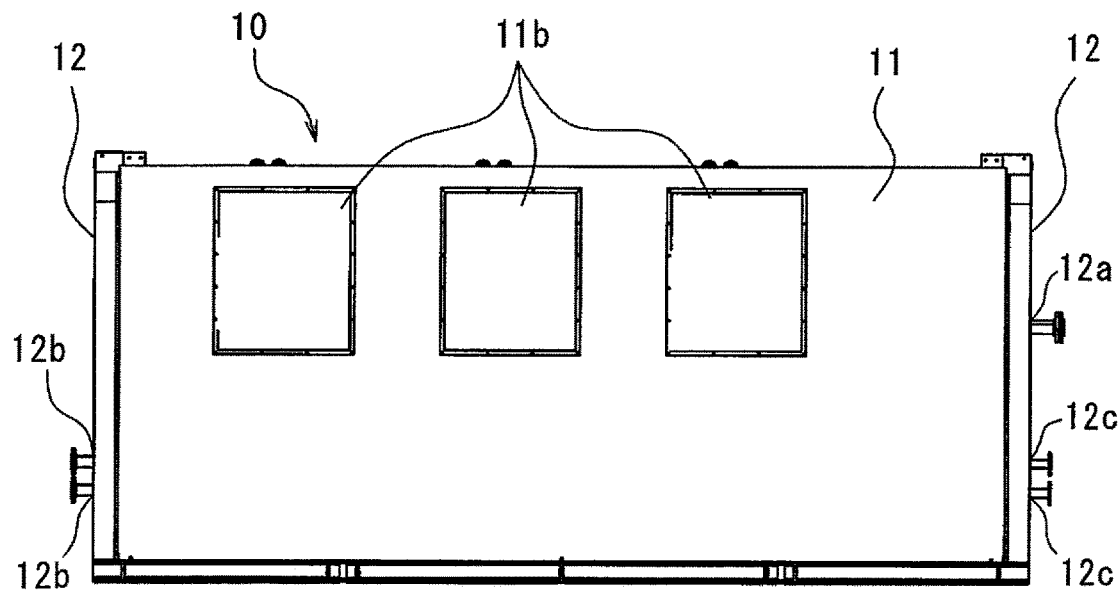
FIG. 5 is a front view showing the outside of the first container.

The outside of the first container 10 will be described with reference to FIGS. 4 and 5. In the present embodiment, the first container 10 is a 20-foot-size container. The size of the first container 10 is not particularly limited, but it is preferably a 20-foot size, or a 40-foot size, normally used as a container.

On the long side surface 11 of the first container 10, vents 11d are provided at positions divided into a plurality of places in the longitudinal direction depending on the installation positions of a plurality of compression-expansion combined machines 13 installed in the longitudinal direction of the first container 10. In addition, an intake/exhaust portion 11b is provided along the longitudinal direction of the first container 10 in which a plurality of vents 11d are provided separately. The intake/exhaust portion 11b may be provided separately depending on the installation position of the vent 11d, or may be integrally provided so as to include the installation position of the vent 11d. In the present embodiment, the vent 11d and the intake/exhaust portion 11b are provided at three positions along the longitudinal direction of the first container 10. In addition, the vent 11d and the intake/exhaust portion 11b are all provided on the same long side surface 11 (side surface perpendicular to the floor surface to be installed), that is, provided on only one surface. In addition, as described above, the two ventilating ports 11a are provided on the long side surface 11 that faces the long side surface 11 on which the vent 11d and the intake/exhaust portion 11b are provided. The installation place of the ventilating port 11a has only to be provided in any spatially vacant place inside the first container 10, and there is no particular restriction in place. If the ventilating port 11a is provided on the upper surface of the first container 10 in consideration of rainwater, one side of the long side surface 11 of the first container 10 can be secured as a maintenance space.

On the short side surface 12 of the first container 10, the first takeout port 12a is provided as described above. In addition, a second takeout port 12b for taking out the heating medium pipe 41 is provided on the short side surface 12 opposite to the short side surface 12 provided with the first takeout port 12a. The second takeout port 12b is specifically two through holes provided on the short side surface 12, and both have substantially the same diameter as the heating medium pipe 41. In addition, as will be described below, a third takeout port 12c for taking out the cooling water pipe 17 is provided on the same surface as the short side surface 12 provided with the first takeout port 12a. The third takeout port 12c is specifically two through holes provided on the short side surface 12, and both have substantially the same diameter as the cooling water pipe 17. That is, in the first container 10, all the pipe takeout ports are provided on the short side surface 12.

Figure 6:
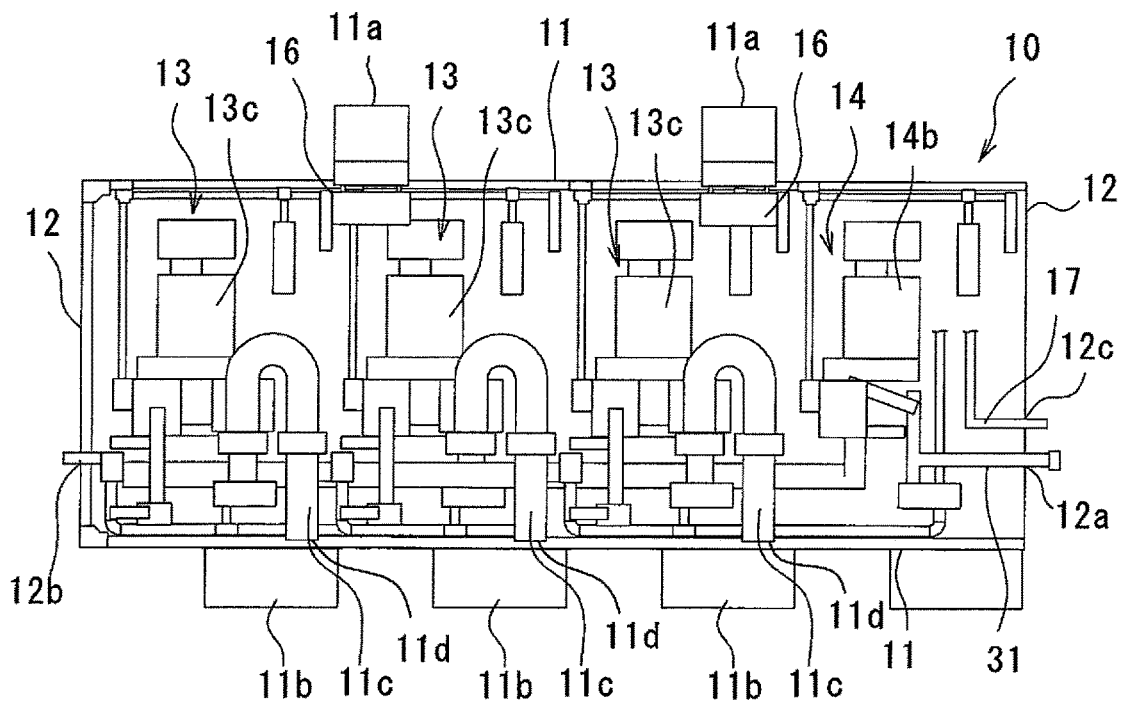
FIG. 6 is a plan view showing the inside of the first container.
Figure 7:
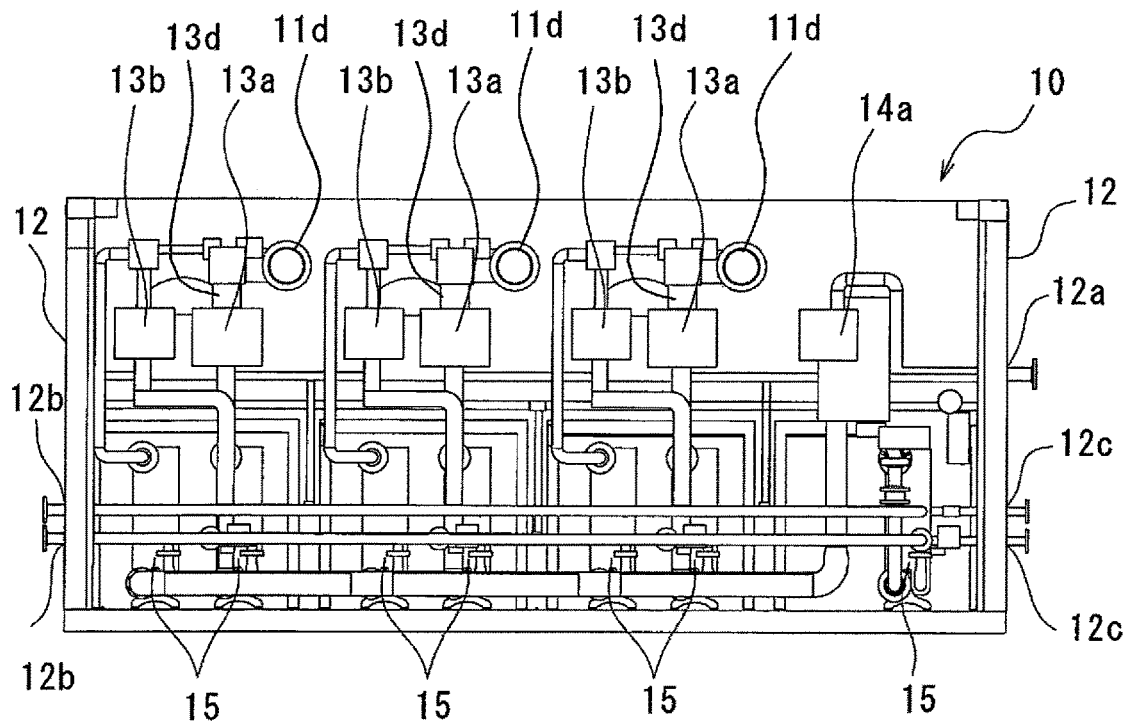
FIG. 7 is a front view showing the inside of the first container.

The inside of the first container 10 will be described with reference to FIGS. 6 and 7. In the present embodiment, three compression-expansion combined machines 13, one high-pressure stage machine 14, and seven heat exchangers 15 are accommodated as machine components in the first container 10. The three compression-expansion combined machines 13 have basically the same specifications, and the six heat exchangers 15 connected to the three compression-expansion combined machines 13 also have basically the same specifications.

The compression-expansion combined machine 13 is a two-stage screw type. The compression-expansion combined machine 13 includes a low-pressure stage rotor unit 13a and a high-pressure stage rotor unit 13b. In addition, the compression-expansion combined machine 13 includes a motor generator 13c mechanically connected to the low-pressure stage rotor unit 13a and the high-pressure stage rotor unit 13b. As the motor generator 13c, the one in which the electric motor and the generator are reversible and can be used in common has a small installation space and is desirable. Each compression-expansion combined machine 13 includes an intake/exhaust port 13d to intake/exhaust from/to the atmosphere. A pipe 11c is connected to the intake/exhaust port 13d of the compression-expansion combined machine 13, a vent 11d being an outlet of the pipe 11c to the outside of the first container 10 communicates with the intake/exhaust portion 11b, and the intake/exhaust portion 11b has an opening communicating with the atmosphere. Therefore, each compression-expansion combined machine 13 can intake or exhaust air from or to the atmosphere through the intake/exhaust portion 11b and the vent 11d. It should be noted that the intake/exhaust portion 11b may include if necessary at least one of an air filter that removes dust from the atmosphere when taking air from the vent 11d and a silencer that silences the expanded air exhausted from the vent 11d before releasing the expanded air to the atmosphere. When both the air filter and the silencer are provided, the pipe 11c may be branched so as to communicate with each of the air filter and the silencer. In that case, it is possible to provide a valve device having a function of circulating air in any one of the pipes branched depending on intake or exhaust.

The compression-expansion combined machine 13 has a function of compressing air using the electric power generated by the wind power plant 2 and a function of expanding the compressed air to generate electric power. Therefore, the compression-expansion combined machine 13 can be switched and used as a compressor or an expander. The compression-expansion combined machine 13 is used within a pressure range of, for example, about 1 MPa. Specifically, air at atmospheric pressure is taken in, compressed to about 1 MPa and discharged, or compressed air of about 1 MPa is supplied, expanded to atmospheric pressure, and exhausted.

When the compression-expansion combined machine 13 operates as a compressor, the motor generator 13c operates as an electric motor (motor). At this time, using the electric power from the wind power plant 2, the motor generator 13c rotates the low-pressure stage rotor unit 13a and the high-pressure stage rotor unit 13b to take in air from the vent 11d through the pipe 11c to compress the air.

When the compression-expansion combined machine 13 operates as an expander, the motor generator 13c operates as a generator. At this time, the low-pressure stage rotor unit 13a and the high-pressure stage rotor unit 13b are supplied with compressed air and expand the compressed air to be driven to rotate. The motor generator 13c receives power from the low-pressure stage rotor unit 13a and the high-pressure stage rotor unit 13b to generate electricity. The air expanded here is exhausted from the intake/exhaust portion 11b through the vent 11d of the pipe 11c. In addition, each compression-expansion combined machine 13 is connected in parallel, and in the present embodiment, three compression-expansion combined machines 13 are fluidly connected to one high-pressure stage machine 14.

The high-pressure stage machine 14 is a single-stage screw type that can be used at a pressure higher than the pressure at which the compression-expansion combined machine 13 is used. The high-pressure stage machine 14 includes a rotor unit 14a and a motor generator 14b mechanically connected to the rotor unit 14a. The high-pressure stage machine 14 is fluidly connected to the first takeout port 12a via the connecting pipe portion 31b. From the viewpoint of facilitating the connection, in the first container 10, the high-pressure stage machine 14 is arranged to be adjacent to the first takeout port 12a.

In the present embodiment, the high-pressure stage machine 14 has a function of compressing air using the electric power generated by the wind power plant 2 and a function of expanding the compressed air to generate electricity, similarly to the compression-expansion combined machine 13. Therefore, the high-pressure stage machine 14 can be used by switching between a compressor and an expander. The high-pressure stage machine 14 is used in a pressure range of, for example, about 1 MPa or more and about 2 MPa or less. Specifically, compressed air of about 1 MPa is taken in, compressed to about 2 MPa, and discharged, or compressed air of about 2 MPa is supplied, expanded to about 1 MPa, and exhausted.

When the high-pressure stage machine 14 operates as a compressor, the motor generator 14b operates as an electric motor (motor). At this time, the motor generator 14b rotates the rotor unit 14a using the electric power from the wind power plant 2, takes in the air compressed by the compression-expansion combined machine 13 to further compress the air, and discharges the air through the connecting pipe portion 31b.

When the high-pressure stage machine 14 operates as an expander, the motor generator 14b operates as a generator. At this time, the rotor unit 14a is supplied with compressed air and expands the compressed air to be driven to rotate. The motor generator 14b receives power from the rotor unit 14a to generate power. The air expanded here is supplied to the compression-expansion combined machine 13, and is used for power generation in the compression-expansion combined machine 13 as described above.

Oil is supplied to the compression-expansion combined machine 13 and the high-pressure stage machine 14 for lubrication, cooling, and the like. In the present embodiment, cooling water is used to lower the temperature of the oil to be supplied. The cooling water is supplied from a cooling water source (not shown) outside the first container 10 to the compression-expansion combined machine 13 and high-pressure stage machine 14 in the first container 10 through a cooling water pipe 17 extending from and passing through one of the third takeout port 12c. In addition, the cooling water used for cooling in the compression-expansion combined machine 13 and the high-pressure stage machine 14 is discharged to the outside of the first container 10 through a cooling water pipe 17 extending from and passing through the other of the third takeout port 12c. The discharged cooling water is returned to a cooling water source (not shown), cooled, and then used again for cooling the compression-expansion combined machine 13 and the high-pressure stage machine 14.

In the first container 10, ventilation fans 16 are attached to the two ventilating ports 11a. Since the mechanical components in the compression-expansion combined machine 13, the high-pressure stage machine 14, and the like have the property of radiating heat, the temperature in the first container 10 easily rises. Therefore, the ventilation fan 16 ventilates the air inside and outside the first container 10 through the ventilating port 11a to prevent an excessive temperature rise in the first container 10.

The heat exchanger 15 is fluidly connected to the high-temperature heating medium tank 42 and the low-temperature heating medium tank 43 through the heating medium pipe 41, and the heating medium flows between them. In addition, the heat exchanger 15 is fluidly connected to the compression-expansion combined machine 13 and the high-pressure stage machine 14, and the compressed air flows between them. In the heat exchanger 15, heat is exchanged between the heating medium and the compressed air. Since the temperature of air rises when the air is compressed, the heat exchanger 15 cools the compressed air and heats the heating medium. In addition, the temperature of air is lowered when the air is expanded, the heat exchanger 15 heats the compressed air and cools the heating medium. The heating medium heated by the heat exchanger 15 is sent to and stored in the high-temperature heating medium tank 42 through the heating medium pipe 41 passing through one of the second takeout port 12b. The heating medium cooled by the heat exchanger 15 is sent to and stored in the low-temperature heating medium tank 43 through the heating medium pipe 41 passing through the other of the second takeout port 12b.

The flow of the heating medium in the heating medium pipe 41 is performed by the heating medium pump 21 (see FIG. 8) described below. The flow rate of the heating medium can be increased or decreased by changing the rotational speed of the heating medium pump 21. Thus, the heating amount and the cooling amount of the compressed air can be regulated.

The heat exchanger 15 is arranged in the first container 10 below each of the rotor units 13a, 13b, and 14a. Therefore, in the first container 10, the air pipe 31 and the cooling water pipe 17 are arranged substantially in the upper part, and the heating medium pipe 41 is arranged substantially in the lower part.

Figure 8:
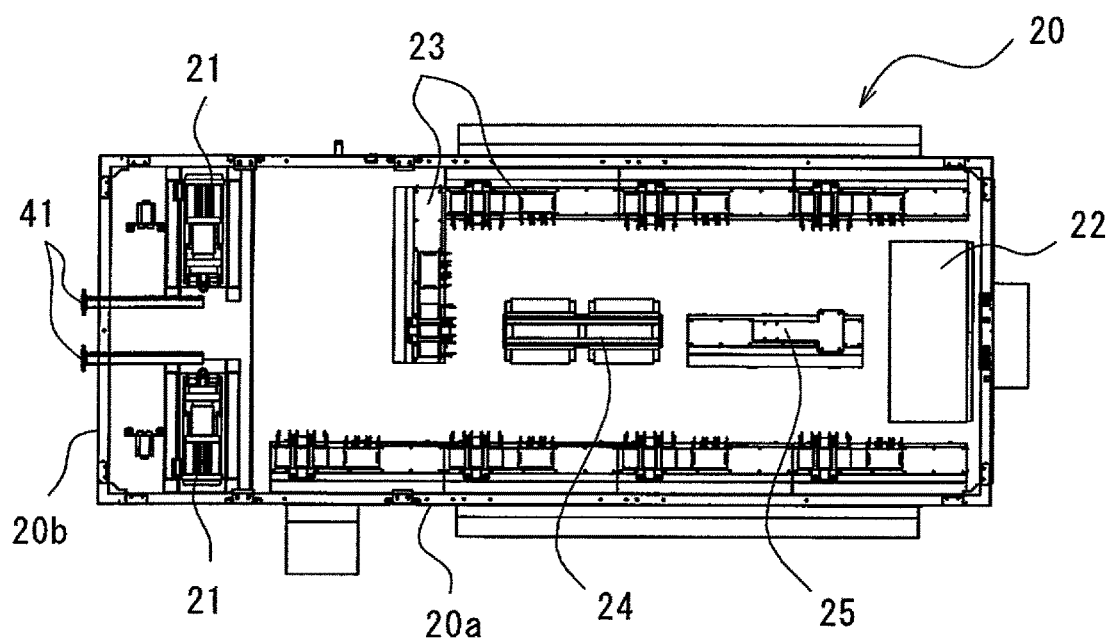
FIG. 8 is a plan view showing the inside of a second container.
Figure 9:
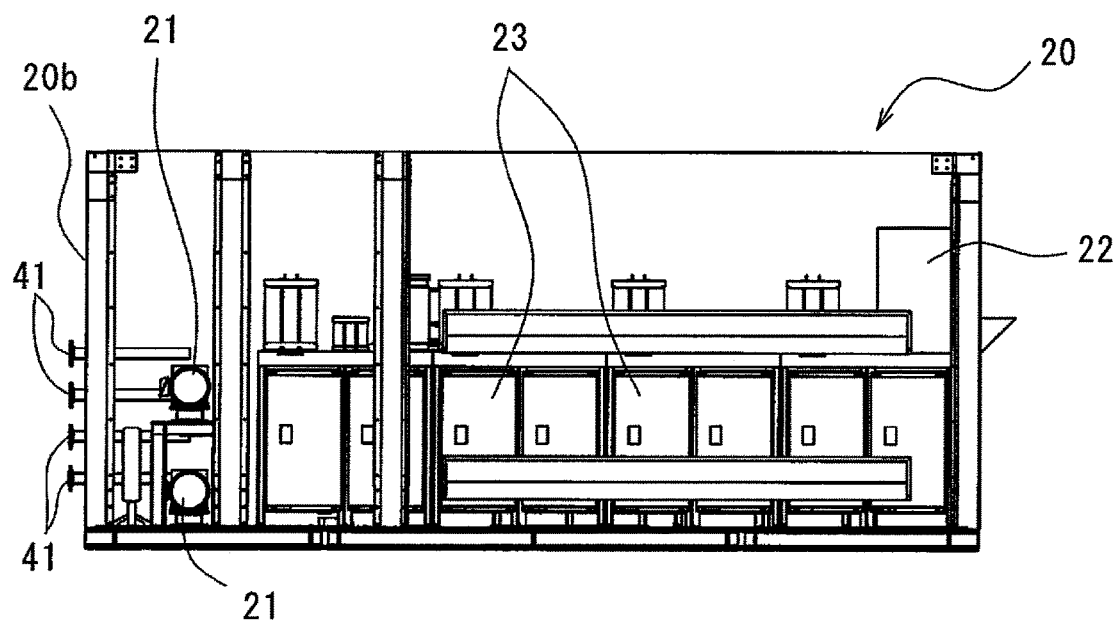
FIG. 9 is a front view showing the inside of the second container.

The second container 20 and the inside thereof will be described with reference to FIGS. 8 and 9. In the present embodiment, the second container 20 is the 20-foot-size container same as the first container 10. The size of the second container 20 is also not particularly limited, but from the viewpoint of versatility, it is preferably a 20-foot size or a 40-foot size similarly to the first container 10.

An inverter and a converter 23, a braking resistor 24, and a control panel 22 are accommodated as electric components in the second container 20. A user U can control the CAES power generation device 1 by operating the control panel 22 from the outside. The control panel 22 receives data on the electric energy requested from a factory or the like (not shown) and the power generation amount of the wind power plant 2. Depending on these differences, it is determined whether the power generation amount of the wind power plant 2 is surplus or insufficient. Based on the determination, the compression-expansion combined machine 13 and the high-pressure stage machine 14 are switched between compression and expansion. In addition, the control panel 22 can also regulate the rotational speed of the compression-expansion combined machine 13 and the high-pressure stage machine 14 and regulate the rotational speed of the heating medium pump 21, and the like.

In addition, the heating medium pump 21 and its inverter 25 are accommodated in the second container 20. In the present embodiment, two heating medium pumps 21 are accommodated in each second container 20. One heating medium pump 21 is provided for the one closed heating medium system (first container 10, low-temperature heating medium tank 43, and high-temperature heating medium tank 42). It should be noted that the heating medium pump 21 does not have to be accommodated in the second container 20 and is preferably accommodated in the first container 10 if there is a storage space.

The size and performance of the CAES power generation device 1 of the present embodiment having the above configuration will be described in detail. The CAES power generation device 1 includes components such as 36 of 20-foot-size first containers 10, 18 of second containers 20 of the same size, and the heat storage unit 40. The power of one first container 10 depends on the power of the compression-expansion combined machine 13 and the high-pressure stage machine 14, and is, for example, 500 kW in the present embodiment. Therefore, the CAES power generation device 1 can exhibit total power of about 18 MW. The CAES power generator 1 has a longitudinal length of about 84.5 m and a lateral length of about 40 m (excluding the pressure accumulation unit 30). Therefore, the CAES power generation device 1 can be installed in a site having an area of about 3380 m², excluding the pressure accumulation unit 30.

The CAES power generation device 1 of the present embodiment has the following advantages.

When the electric power is surplus with respect to fluctuations in the electric energy generated in the wind power plant 2, the compression-expansion combined machine 13 is driven as a compressor using the surplus electric power, and the compressed air is stored in the pressure accumulation unit 30. When the electric power is insufficient, the compression-expansion combined machine 13 is driven as an expander using the compressed air of the pressure accumulation unit 30 to generate electric power. As described above, since the compression-expansion combined machine 13 is switched and used in a timely manner, as compared with the case where a compressor and an expander are provided individually, the number of installed machines can be reduced, and as a result, the cost can also be reduced. In addition, when the compression-expansion combined machine 13 is driven as a compressor, the temperature of the compressed air rises due to the compression heat, the heating medium is heated by the compression heat in the heat exchanger 15, and the high temperature heating medium is stored in the high-temperature heating medium tank 42. Then, when the compression-expansion combined machine 13 is driven as an expander, heating the compressed air supplied to the compression-expansion combined machine 13 using the high temperature heating medium in the heat storage unit 40 in the heat exchanger 15 improves power generation efficiency.

Since a plurality of compression-expansion combined machines 13 and a plurality of heat exchangers 14 are accommodated in the first container 10, the transportation and the on-site construction can be easily performed. In the first container 10, since the vent 11d communicating with the intake/exhaust port 13d of the compression-expansion combined machine 13 is provided on the long side surface 11 having a large contact area with the atmosphere, intake and exhaust can be efficiently performed. Since the short side surface 12 is provided with the first takeout port 12a and the second takeout port 12b, even if a plurality of first containers 10 are arranged side by side with the intervals reduced so that the long side surfaces 11 face each other, there is no obstruction to the handling of the air pipe 31 and the heating medium pipe 41. Therefore, since the first container 10, the pressure accumulation unit 30, the heat storage unit 40, and the like can be efficiently arranged in a small area, the CAES power generation device 1 can be downsized.

Since the intake/exhaust portion 11b is provided on the same surface in each first container 10, maintainability can be improved. Since the intake/exhaust portion 11b and the compression-expansion combined machine 13 are fluidly connected by the pipe 11c, it is difficult to provide an opening/closing portion on the surface on which the intake/exhaust portion 11b is provided in the first container 10. Therefore, if the intake/exhaust portion 11b is provided on a plurality of surfaces, the surfaces that can be opened and closed are limited, and maintainability deteriorates. In other words, when all the intake/exhaust portions 11b are provided on the same surface as in the present embodiment, the other surfaces can be easily opened and closed, so that maintainability can be improved. In addition, even if the other surfaces are not openable, the maintenance worker or the like moving on the side on which the intake/exhaust portion 11b is not provided when moving near the first container 10 allows the maintenance worker or the like to move safely without being affected by intake or exhaust.

When the high-pressure stage machine 14 functions as a compressor, air can be compressed to a high pressure. Therefore, since the pressure of the compressed air stored in the pressure accumulation unit 30 can be increased, the pressure accumulation unit 30 can be downsized. In addition, when the high-pressure stage machine 14 functions as an expander, it is possible to generate electricity using high-pressure compressed air. Specifically, if the high-pressure stage machine 14 is not provided and it is attempted to supply high-pressure compressed air to the compression-expansion combined machine 13 for power generation, it is necessary to reduce the supply pressure according to the pressure resistance performance. At this time, reducing the supply air pressure causes energy loss corresponding to the reduced pressure. However, since the usable pressure range can be expanded by providing the high-pressure stage machine 14, energy loss can be reduced and power generation efficiency can be improved. In addition, since the high-pressure stage machine 14 is arranged adjacent to the first takeout port 12a in the first container 10, the high-pressure stage machine 14 can be easily connected to the pressure accumulation unit 30.

Since the high-pressure stage machine 14 is a single-stage type, a small-sized high-pressure stage machine 14 can be used. Since the compression-expansion combined machine 13 is a two-stage type, a wide applicable pressure range can be secured.

In addition, electric components such as the control panel 22 and the compression-expansion combined machine 13 are accommodated in separate containers. Therefore, it is possible to prevent harmful effects due to exhaust heat from the compression-expansion combined machine 13 from being exerted on electric components such as the control panel 22.

The heating medium pump 21 enables stable heat exchange in the heat exchanger 15, and the transportation and on-site construction of the heating medium pump 21 can be facilitated.

Since the oil used in the compression-expansion combined machine 13 can be cooled by the cooling water, an excessive temperature rise of the compression-expansion combined machine 13 can be prevented. In addition, since the third takeout port 12c is provided on the short side surface 12 of the first container 10, even if the first containers 10 are arranged side by side so that the long side surfaces 11 face each other as described above, there is no obstruction to the handling of the cooling water pipe 17. Therefore, each component can be efficiently arranged.

Second Embodiment

Figure 10:
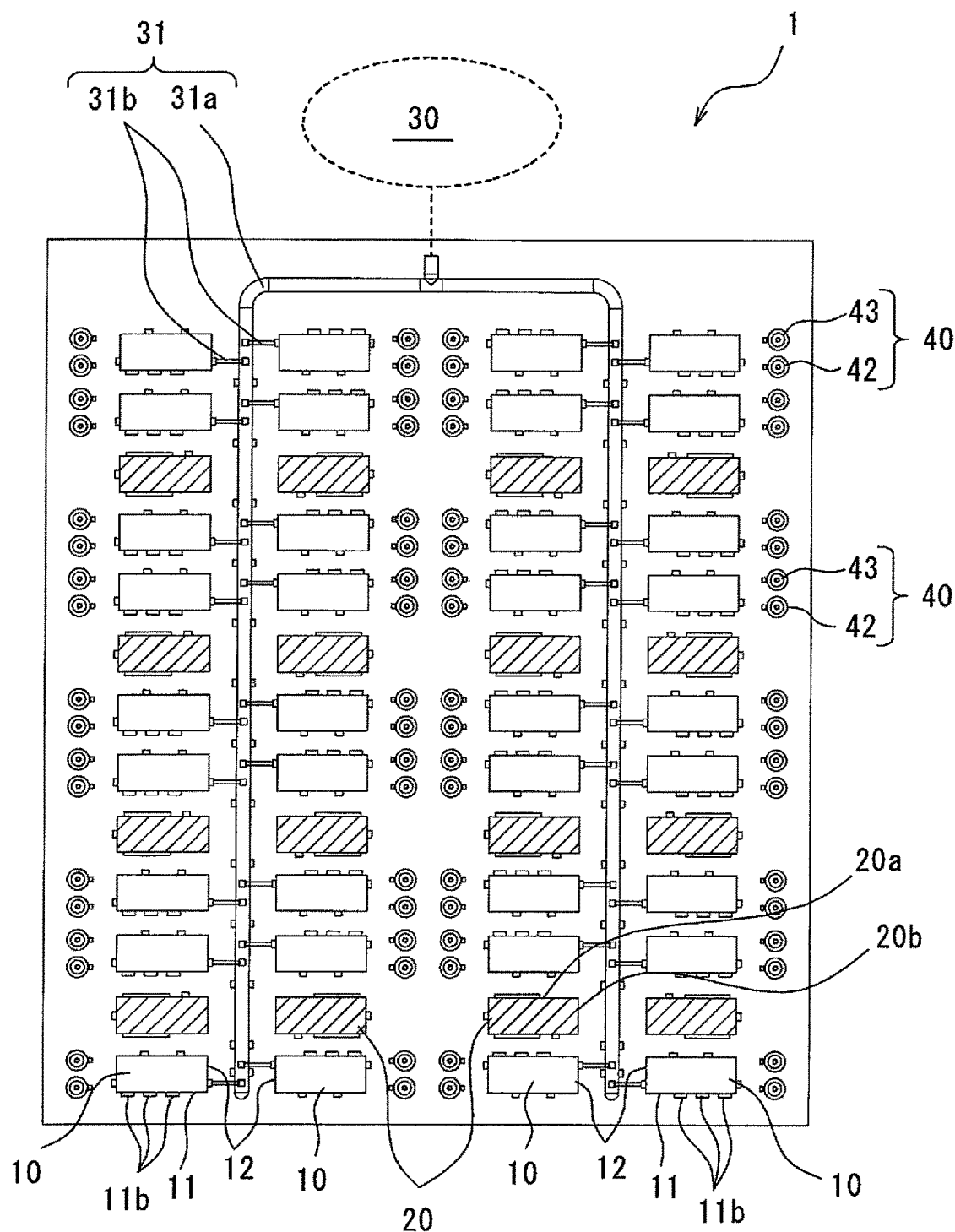
FIG. 10 is a plan view of a compressed air energy storage power generation device according to a second embodiment.

The CAES power generation device 1 of the second embodiment shown in FIG. 10 differs from that of the first embodiment in the arrangement of the first container 10 and the second container 20. Except for the configuration related to this arrangement, the configuration is substantially the same as the configuration of the CAES power generation device 1 of the first embodiment. Therefore, the same components as those shown in the first embodiment are denoted by the same reference numerals and the description thereof will be omitted.

In the present embodiment, a plurality of first containers 10 are arranged on both sides across the pressure feeding pipe portion 31a, and the short side surface 12 of the first container 10 faces the pressure feeding pipe portion 31a. It should be noted that in FIG. 10, the heating medium pipe 41 (see FIG. 2) is omitted for clarity of illustration. In addition, in FIG. 10, the second container 20 is virtually hatched to distinguish the first container 10 from the second container 20.

The second containers 20 are also arranged on both sides across the pressure feeding pipe portion 31a, and the short side surface 20b of the second container 20 faces the pressure feeding pipe portion 31a. The second container 20 is arranged between the first containers 10 arranged side by side along the pressure feeding pipe portion 31a.

The CAES power generator 1 of the present embodiment has a longitudinal length of about 62.5 m and a lateral length of about 54 m excluding the pressure accumulation unit 30. Therefore, the CAES power generation device 1 of the present embodiment can be installed in a site having an area of about 3375 m², excluding the pressure accumulation unit 30. Therefore, the CAES power generation device 1 of the second embodiment is downsized as compared with the CAES power generation device 1 of the first embodiment.

According to the present embodiment, since the first containers 10 are arranged on both sides across the pressure feeding pipe portion 31a, the CAES power generation device 1 can be downsized as compared with the case where the first containers 10 are arranged on one side. In addition, since the short side surface 12 of the first container 10 faces the pressure feeding pipe portion 31a, many first containers 10 can be arranged along the pressure feeding pipe portion 31a.

As described above, although the specific embodiment of the present invention is described, the present invention is not limited to the above-described embodiment, and can be implemented with various modifications within the scope of the present invention.

In the above embodiment, examples of power generation by renewable energy and the like include wind power generation, but in addition to this, all of the power generation using irregularly fluctuating energy constantly or repeatedly supplemented by natural power such as sunlight, solar heat, wave power, tidal power, running water, or tidal power can be targeted. Furthermore, in addition to renewable energy, all of those in which the power generation amount fluctuates, such as factories having power generation facilities that operate irregularly can be targeted.

In the above embodiment, the high-pressure stage machine 14 has the functions of both the compressor and the expander, but it may have the function of only one of the compressor and the expander. In addition, in the above embodiment, since the high-pressure stage machine 14 is used within the pressure range of about 2 MPa, a single stage type is adopted, but when it needs to be used in a higher pressure range (for example, within about 5 MPa), a multi-stage type may be adopted.

In the above embodiment, as the long side surface 11 provided with the intake/exhaust portion 11b communicating with the vent 11d, a side surface perpendicular to the floor surface to be installed is exemplified, but the long side surface 11 here also includes an upper surface parallel to the floor surface. Therefore, the vent 11d and the intake/exhaust portion 11b may be provided on the upper surface of the first container 10. When the intake/exhaust portion 11b communicating with the vent 11d is provided on the upper surface, the vent 11d and the intake/exhaust portion 11b are preferably provided near the edge portion of the upper surface.

In the above-described embodiment, in each row of the first container 10, the long side surfaces 11 provided with the intake/exhaust portions 11b face the same direction, but the first containers 10 may be arranged so that the long side surfaces 11 provided with the intake/exhaust portions 11b face each other. Since the intake/exhaust portion 11b of the first container 10 often projects to the outside, it may obstruct the passage of the maintenance worker. However, arranging the first containers 10 so that the long side surfaces 11 provided with the intake/exhaust portions 11b face each other allows the maintenance worker to easily pass on the side where the intake/exhaust portion 11b is not provided.

In the above-described embodiment, one second container 20 is assigned to two first containers 10, but the ratio is not limited to this. Three or more first containers 10 may be assigned to one second container 20 if the storage and air conditioning of the second container 20 permits it.

The invention claimed is:

1. A compressed air energy storage power generation device comprising:
    a plurality of compression-expansion combined machines having a function of compressing air using electric power and a function of generating power by expanding compressed air;
    a pressure accumulation unit fluidly connected to each compression-expansion combined machine, and configured to store the compressed air;
    a plurality of heat exchangers configured to exchange heat between the compressed air and a heating medium to cool the compressed air supplied from each of the compression/expansion/combined machines to the pressure accumulation unit and heat the heating medium, or to heat the compressed air supplied from the pressure accumulation unit to each compression-expansion combined machine and cool the heating medium;
    a heat storage unit fluidly connected to each of the heat exchangers, and configured to store the heating medium; and
    a plurality of first containers having a rectangular parallelepiped shape,
    wherein each of the plurality of first containers accommodates the plurality of compression-expansion combined machines and the plurality of heat exchangers,
    wherein the plurality of first containers are arranged side by side so that long side surfaces face each other,
    wherein the long side surface of each of the first containers is provided with at least one vent being an outlet of a pipe for communicating each compression-expansion combined machine with an outside of a container, and
    wherein a short side surface of each of the first containers is provided with a first takeout port for taking out an air pipe that fluidly connects each compression-expansion combined machine and the pressure accumulation unit, and a second takeout port for taking out a heating medium pipe that fluidly connects each of the heat exchangers and the heat storage unit.

2. The compressed air energy storage power generation device according to claim 1, wherein
    the at least one vent is provided only on one surface of the long side surfaces, and comprises a plurality of vents, and
    the plurality of vents are provided at a plurality of places according to a number of the compression/expansion/combined machines.

3. The compressed air energy storage power generation device according to claim 1, further comprising
    a high-pressure stage machine fluidly connected to the compression-expansion combined machines and used at a pressure higher than a pressure at which the plurality of compression-expansion combined machines are driven, wherein the high-pressure stage machine is arranged adjacent to the first takeout port in each of the first containers.

4. The compressed air energy storage power generation device according to claim 1, further comprising:
an electrical component related to drive of each of the compression/expansion/combined machines; and
a second container that accommodates the electrical component.

5. The compressed air energy storage power generation device according to claim 4, further comprising a heating medium pump configured to flow the heating medium between each of the heat exchangers and the heat storage unit,
wherein the heating medium pump is accommodated in the second container.

6. The compressed air energy storage power generation device according to claim 1,
wherein in each of the first containers, a cooling water pipe through which cooling water for cooling oil used in each compression-expansion combined machine flows is provided, and
wherein a short side surface of each of the first containers is provided with a third takeout port for taking out the cooling water pipe.

7. The compressed air energy storage power generation device according to claim 1,
wherein the air pipe includes a pressure feeding pipe portion extending from the pressure accumulation unit, and a connecting pipe portion that connects the pressure feeding pipe portion and each compression-expansion combined machine, and
wherein the first containers are arranged on both sides across the pressure feeding pipe portion, and the short side surface of each of the first containers faces the pressure feeding pipe portion.

8. The compressed air energy storage power generation device according to claim 2, further comprising
a high-pressure stage machine fluidly connected to the compression/expansion/combined machines and used at a pressure higher than a pressure at which the plurality of compression-expansion combined machines are driven,
wherein the high-pressure stage machine is arranged adjacent to the first takeout port in each of the first containers.

9. The compressed air energy storage power generation device according to claim 2, further comprising:
an electrical component related to drive of each compression-expansion combined machine; and
a second container that accommodates the electrical component.

10. The compressed air energy storage power generation device according to claim 9, further comprising a heating medium pump configured to flow the heating medium between each of the heat exchangers and the heat storage unit,
wherein the heating medium pump is accommodated in the second container.

11. The compressed air energy storage power generation device according to claim 2,
wherein in each of the first containers, a cooling water pipe through which cooling water for cooling oil used in each compression-expansion combined machine flows is provided, and
wherein a short side surface of each of the first containers is provided with a third takeout port for taking out the cooling water pipe.

12. The compressed air energy storage power generation device according to claim 2,
wherein the air pipe includes a pressure feeding pipe portion extending from the pressure accumulation unit, and a connecting pipe portion that connects the pressure feeding pipe portion and each compression-expansion combined machine, and
wherein the first containers are arranged on both sides across the pressure feeding pipe portion, and the short side surface of each of the first containers faces the pressure feeding pipe portion.

* * * * *